Patented Oct. 23, 1923.

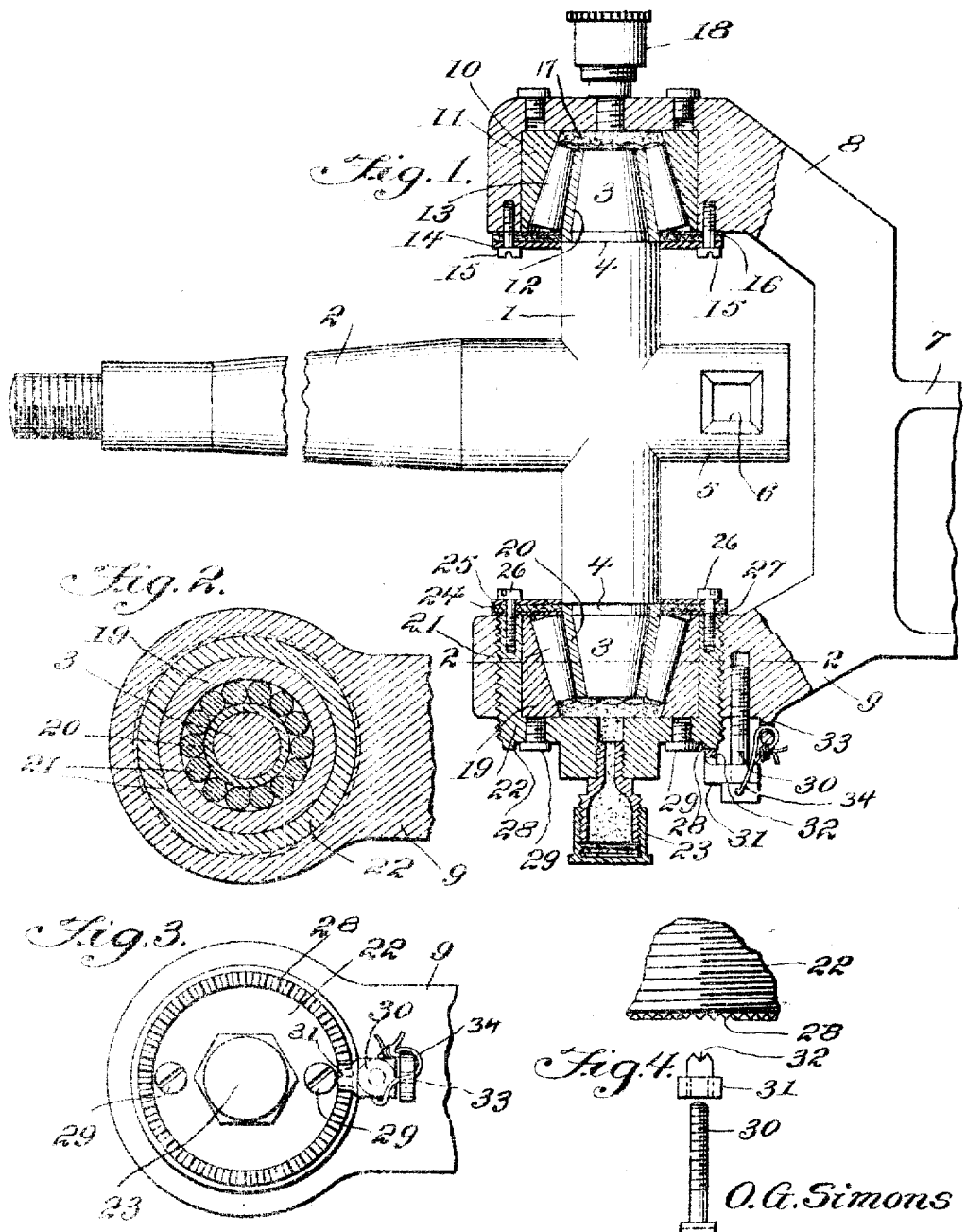

1,471,575

UNITED STATES PATENT OFFICE.

ORVAL G. SIMONS, OF WELDON, TEXAS.

AUTOMOBILE SPINDLE MOUNTING.

Application filed July 22, 1922. Serial No. 576,775.

*To all whom it may concern:*

Be it known that I, ORVAL G. SIMONS, a citizen of the United States, residing at Weldon, in the county of Houston and State of Texas, have invented new and useful Improvements in Automobile Spindle Mountings, of which the following is a specification.

The object of my said invention is the provision of an automobile spindle mounting calculated to render easy the steering of an automobile and embodying such a construction that frictional wear of the spindle and axle is reduced to a minimum, and wear and lost motion can be expeditiously and effectively taken up.

To the attainment of the foregoing, the invention consists in the improvement as hereinafter described and definitely claimed.

In the accompanying drawings, forming part of this specification:—

Figure 1 is a view showing my novel mounting in vertical section as associated with the left hand front steering spindle of an automobile.

Figure 2 is a horizontal section taken in the plane indicated by the line 2—2 of Figure 1, looking downwardly.

Figure 3 is an inverted plan view of a portion of the construction.

Figure 4 comprises disconnected views of the parts that cooperate to prevent loosening of the nut 22.

Similar numerals of reference designate corresponding parts in all views of the drawings.

In accordance with my invention the upper and lower ends of the shank 1 on the spindle 2 are tapered as designated by 3, shoulders 4 being provided at the inner ends of the said tapered end portions. It will also be noticed that the shank 1 is provided at a point opposite to the spindle 2 with a lateral projection 5 in which is a tapered hole 6 to receive a steering arm (not shown).

At 7 I illustrate an automobile front axle the end of which is merged into upper and lower arms 8 and 9. The upper axle arm 8 is recessed as indicated by 10 to receive an outer bearing cup 11, a taper bushing 12, and a roller bearing 13 interposed between the cup 11 and the bushing 12. The said cup 11, bushing 12 and roller bearing 13 are retained in position by a metallic annulus 14 connected by screws 15 to the arm 8, a dust annulus 16 being superimposed on the washer 14 as illustrated. In the space within the upper portion of the cup 11 is a mass of appropriate packing 17 in communication with an oil cup 18 carried by the arm 8.

Carried by the lower arm 9 of the axle 7 is an outer bearing cup 19 with a tapered bore, and pressed on the lower tapered portion 3 of the shank 1 is a hard metal bushing 20. Between the cup 19 and the bushing 20 is a roller bearing 21. Surrounding and disposed below the lower end of the cup 19 is a bearing-adjusting nut 22 threadedly engaged with the arm 9. The said nut 22 carries a grease cup 23, and the space between the upper side of the nut 22 and the low portions of the bushing 20 and roller bearing 21 is occupied with grease as illustrated. Above the roller bearing 21 and the cup 19 is a felt dust-excluding washer 24 on which is superimposed a metallic washer 25 which is retained in position by screws 26 threaded into the nut 22. At the underside of the felt washer 24 is a steel thrust washer 27 which latter is arranged immediately above the roller bearing 21 as illustrated. At 28 are teeth on the adjusting nut 22, and at 29 are screws carried by the nut 22 and adapted to adjust the cup 19. Connected to the arm 9 is a screw 30 for adjusting the nut lock designated by 31, the said nut lock 31 being provided with a notch 32 which affords teeth as shown opposed to the annular toothed edge of the nut 22 with a view to precluding casual loosening of the said nut 22. It will also be noticed that the arm 9 is provided with a pendent apertured portion 33 for the engagement of a wire 34 through the medium of which the head of the screw 30 is connected to the arm 9 in order to further prevent casual loosening of the nut 22.

It will be apparent from the foregoing that in virtue of the described construction of the lower bearing of the spindle shank 1, adjustment may be quickly and easily made to compensate for wear; also, the construction is such that wear of the axle and the spindle shank is reduced to a minimum, and this in a construction which renders steering exceedingly easy.

I have entered into a detailed description of the construction and relative arrangement of the parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim, and desire to secure by Letters Patent, is:—

1. In a steering spindle mounting, the combination with a spindle shank having a tapered end portion, and an axle, of a bushing mounted on said tapered end portion, a bearing cup with a taper bore carried by the axle, a roller bearing interposed between the bushing and the bearing cup, a bearing adjusting nut carried by the axle, and locking means carried by the axle and engaging said nut.

2. In a steering spindle mounting, the combination with a spindle shank having a tapered end portion, and an axle, of a bushing mounted on said tapered end portion, a bearing cup with a taper bore carried by the axle, a roller bearing interposed between the bushing and the bearing cup, a bearing adjusting nut carried by the axle, and locking means carried by the axle and engaging said nut, said locking means including a screw connected to the axle and a lock nut on the screw and maintained in toothed engagement with the adjusting nut.

3. In a steering spindle mounting, the combination with an axle and a spindle shank having a tapered end portion, of a bearing cup with a taper bore carried by the axle, a roller bearing in said cup, and a bearing adjusting nut carried by the axle.

4. In a steering spindle mounting the combination with an axle, and a spindle shank having a tapered end portion, of a roller bearing arranged intermediate of the axle and said tapered end portion, and means carried by the axle for adjusting said bearing.

5. In a steering spindle mounting, the combination with an axle having upper and lower spaced arms, and an upright spindle shank having tapered end portions, bearing cups carried in the arms of the axle, roller bearings interposed between said cups and the tapered end portions of the spindle shank, and means carried by the lower arm of the axle for the adjustment of the lower cup.

6. In a steering spindle mounting, the combination with a spindle shank having a tapered end portion, and an axle, of a bushing mounted on said tapered end portion, a bearing cup with a taper bore, a roller bearing interposed between the bushing and the bearing cup, a bearing adjusting nut carried by the axle, an adjusting nut lock, and an adjusting nut lock screw connected with the axle.

7. In a steering spindle mounting, the combination with a spindle shank having a tapered end portion, and an axle, of a bushing mounted on said tapered end portion, a bearing cup with a taper bore, a roller bearing interposed between the bushing and the bearing cup, a bearing adjusting nut carried by the axle, an adjusting nut lock, and an adjusting nut lock screw connected with the axle, the said adjusting nut being provided with a tooth.

8. In a steering spindle mounting, the combination with a spindle shank having a tapered end portion, and an axle, of a bushing mounted on said tapered end portion, a bearing cup with a taper bore, a roller bearing interposed between the bushing and the bearing cup, a bearing adjusting nut carried by the axle, an adjusting nut lock, and an adjusting nut lock screw connected with the axle; the said adjusting nut lock being provided with a notch.

In testimony whereof I affix my signature.

ORVAL G. SIMONS.